Oct. 5, 1943. R. G. DREW 2,330,814
COMPOSITE SHEET MATERIALS AND METHOD OF MAKING THE SAME
Filed March 30, 1929
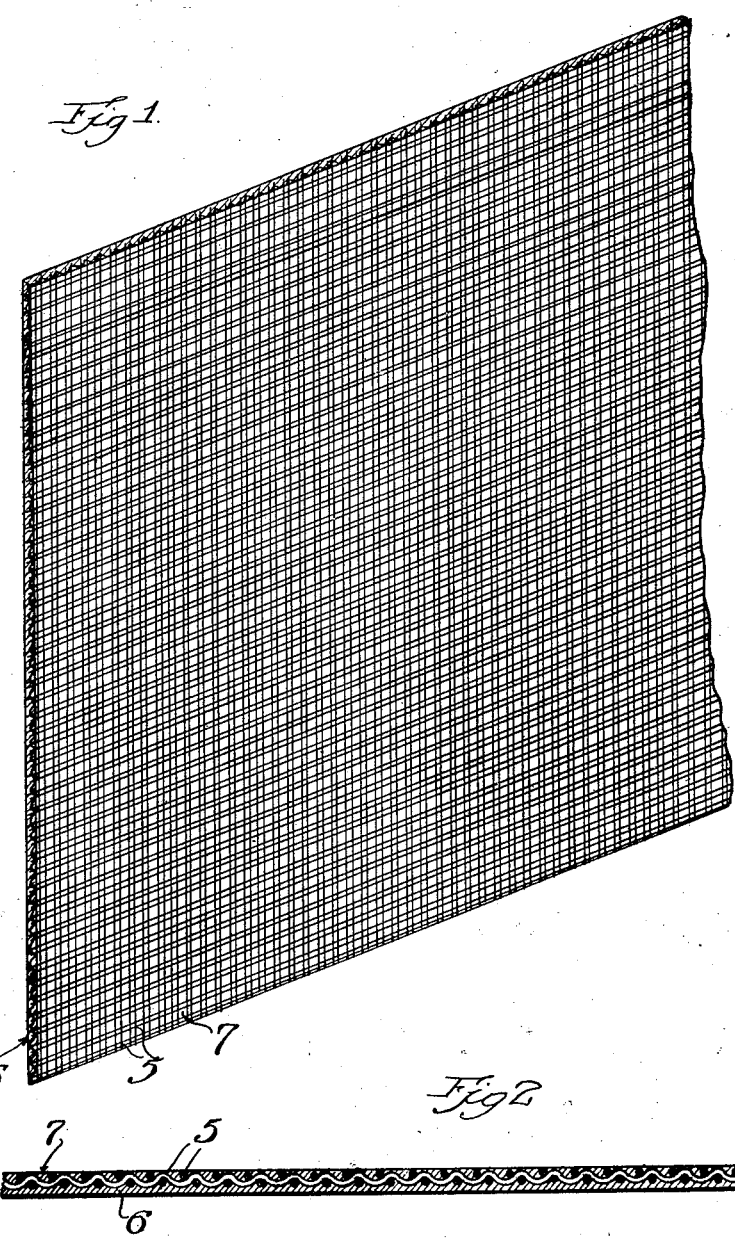

Patented Oct. 5, 1943

2,330,814

UNITED STATES PATENT OFFICE 2,330,814

COMPOSITE SHEET MATERIAL AND METHOD OF MAKING THE SAME

Richard Gurley Drew, St. Paul, Minn., assignor, by mesne assignments, to Minnesota Mining & Manufacturing Company, a corporation of Delaware Application March 30, 1929, Serial No. 351,146

11 Claims. (Cl. 92—40)

This invention relates in general to composite sheet material and more particularly to the production of composite paper manufacture, that is, combined threaded, spun and/or woven fabric and cellulose, such, for example, as combined paper and cloth sheet material, and while the invention is described as particularly suitable as a backing for a rubber adhesive tape, it will be understood that it finds a wide field of utility for analogous and related purposes.

In the manufacture and use of adhesive and gummed tapes having a paper backing a demand has arisen for a more substantial and stronger backing for rubber tape, such, for example, wherein the tape is applied to various articles of furniture, doors, etc., for protecting the finished or other surfaces thereof in transit or storage, and where a gummed or rubber adhesive tape is so applied and sometimes remains on the article for a considerable period of time it permits the rubber to acquire its full bonding strength and difficulty is experienced in removing the tape without tearing the paper backing, and without leaving a deposit of rubber on the surface protected.

Other advantages in the manufacture and use of adhesive and gum tapes of combined threaded, spun and/or woven fabric and cellulose or paper reside in using the impenetrability of paper for economic and even coating of the adhesive layer thereon and the strength of a threaded, spun and/or woven fabric to prevent lamination.

Efforts to strengthen the paper backing solely by a so-called glue, glycerine, formaldehyde treatment serve to reinforce the backing and have met with moderate success for some purposes, but for the purposes of my present invention such treatment is unsuitable as it lacks the required strength to prevent a laminating effect or tearing under circumstances such as pointed out above. The present invention has been designed to meet the demand outlined above and for other purposes, for example, this invention will also find utility in some respects as a backing for sandpaper, either glue bond or waterproof.

The principal objects and advantages of this invention reside in the provision of a novel sheeting article combining a woven fabric and cellulose material; the provision of an improved composite threaded, spun and/or woven fibre and cellulose fibre sheeting combined into a homogeneous structure; the provision of an improved method of reinforcing a paper sheeting material; the provision of an improved composite sheet of cloth and paper; the provision of an improved sheeting including a cloth portion and cellulose fibres forced into intimate association therewith; the provision of an improved sheeting material including paper fibres and a woven fabric associated together with or without an adhesive material and the method of making the same; the provision of an improved sheeting material including a woven fabric and a paper pulp applied thereto in a plastic state together with the method of intimately associating these elements and for removing moisture from the article at the same time; and the provision of an improved sheeting material including as principal elements a woven fabric and a cellulose fibre mass suitable, after association, as a backing for an adhesive material such as rubber or the like to form adhesive tape or as a base or backing for flexible abrasive articles.

The foregoing objects and advantages are attained in an embodiment of the invention which is illustrated in the accompanying drawing, which drawing is intended to be representative of one form of the invention which I have produced.

The present invention resides in a composite woven fibre and cellulose fibre brought together into intimate relationship so as to form a composite sheet which possesses the desirable qualities of both paper and cloth individually, that is, includes the desirable flexibility for some purposes possessed ordinarily by cloth and also the strength possessed by cloth and at the same time possesses the desirable characteristics of paper, that is, the provision of a smooth substantially uninterrupted surface to which adhesive may be applied, when, as in the case of the present invention and the example particularly pointed out herein, the adhesive is applied to the cloth side of the tape formed by this invention.

The invention includes the employment of a woven fabric similar to cheese cloth or ordinary hospital gauze, though, for my purposes, I prefer to employ a starched cheese cloth which is a treated cloth having been soaked or otherwise treated in a suitable adhesive or sizing material, such, for example, as corn dextrine.

The cloth is placed in position upon a paper making machine blanket to receive a paper pulp, such, for example, as may be employed in making a 35 pound to the ream absorbent paper sheet, and this layer is applied to the cloth and either pressure or suction applied to both which serves to remove the moisture from the paper pulp and also to cause the pulp while still in a plastic state to enter the interstices in the woven fabric, as well as to expose the spun or woven fabric to the wetting action of the extraneous fluid and of the paper size carried thereby.

As a method of making a flexible backing for sandpaper, I have employed a piece of cloth and a layer of paper pulp joined together with an adhesive, such as hide glue, which serves to bond together the paper and cloth. I have employed various types of adhesives in this connection, and while a sheet suitable as a sandpaper backing resulted, the article did not contain the desirable flexibility for a tape backing.

The tape backing to which I have reference, is employed in protecting lacquered surfaces and usually an adhesive film such as compounded rubber is applied to the cloth side of the composite sheet backing. In such an instance, I have employed a starched cheese cloth, applied the paper and immediately thereafter run the two under a coating knife so as to apply the rubber adhesive compound to serve as a bond between the paper and cloth, this adhesive, being applied to the cloth side and striking through the interstices, serves to gain an anchorage on the paper phase of the composite sheet. The foregoing produces a very desirable tape for many purposes, but produces some difficulties in handling, that is, when running both the paper and the cloth uncombined, that is, prior to passing under the coating knife, and in order to obviate such difficulties the following preferred method is employed.

I place a strip of starched cheese cloth in position upon a wire mesh covered with a felt filter which is in communication with a source of suction from beneath. Upon the cheese cloth, I apply the paper pulp still in a plastic state and then force the paper pulp into the interstices of the cloth and at the same time force off the superfluous liquid content of the paper pulp either by applying a suction beneath the felt filter or by applying suitable pressure to the top of the paper layer. The paper fibre and the woven fabric thus become interlocked owing to the entrance of the paper fibre into the spaces between the threads of the woven fabric, and also due to the character of the paper size still remaining in the pulp and the wetting action of the fluid on the starch or similar size carried by the cheese cloth or similar spun fibre, where such is used. A suitable continuous operation of this character may be conducted on a production machine by feeding the cloth onto the wet or forming end of the paper making machine in such manner that water carrying the paper fibre pulp may flow over the cloth, wetting the same preferably for purposes above indicated, and deposit the actual superfluous water through the cloth, thus bringing the paper fibre into intimate contact with the spun threads or the woven fabric or cloth or the threads thereof. In this manner, a much thinner finished product is obtainable which has less delaminating tendencies than if the same weight of paper is formed separately and then combined with cloth as by the earlier methods known to me.

I may also employ an alternative method which is to combine the cheese cloth with a sheet of paper (as distinguished from the pulp) still carrying fifty per cent or more of the required forming water. When the sheet is applied to the woven fabric the two materials are then run through a wringer or other pressor rolls which forces the woven fabric and fibres of the sheet into intimate connection and in a desirable degree force the wet paper fibre into the interstices in the woven fabric. This method of forming the article of this invention is a relatively simple operation and more quickly accomplished in some instances than in applying the cloth or woven fabric to the forming apron at the wet end of the usual paper making machine, particularly where the cheese cloth is first treated with a size which becomes adhesive when wetted or the water pressed from the fibre carries a slight amount of sizing material with it which, upon drying, becomes a bond for the spun fibrous threads.

It will be understood that should a more thorough bond between the paper and cloth be required, such, for example, where the product is to be employed for heavier grades, I have employed a suitable adhesive substance, that is, a substance such as corn dextrine, casein and various grades of hide glue, which is applied as a sizing to the woven fabric. This sizing is applied to the side of the fabric, and/or spun fibrous threads, which is to come in contact with the wet paper sheet or with the plastic paper pulp, which latter, acts, when the woven fabric and paper sheet are combined, to moisten the adhesive and thus render it effective in enhancing the bond, between the paper phase and woven fabric of the combination.

I have found in one instance, that cheese cloth treated with corn dextrine resulted in a much firmer bond between the paper and the woven fabric than in instances where the cloth was untreated. This desirable advantage permits a very positive control over the operation of forming the composite paper and woven fabric while the paper phase or sheet is actually being produced on a paper making machine.

It will be understood that considerable latitude must be given as to the question of the type, grade, thickness and quality of the paper face material, and the woven fabric and that the nature of these two elements will, of necessity, vary depending upon the type of backing product which is desired. I find that a very low count weave fabric will serve the purpose in some instances better than a cloth of high count and of very tight weave, apparently because of the more open construction in the low count cloth allows the paper pulp to more intimately interlock with the threads of the woven fabric. Furthermore, it is possible to attain, with an open weave fabric, a much thinner resultant product which minimizes the delaminating or splitting properties or without a material loss of strength and with a much increased flexibility because the open construction of the cloth permits the pressure of the squeeze rolls or the force of suction to draw the wet paper pulp into the interstices in the woven fabric and distort the threads into the plane of the paper finally formed.

When the composite sheet, that is, the sheet including the paper pulp and the woven fabric has been completed, it is preferable that it be properly treated in order that it will afford a practical backing for a rubber tape or for the purpose for which the material is intended.

I have found that a treatment of glue, glycerine and formaldehyde give to the paper side of the combination a suitable treatment where the backing is to be used as a base for rubber adhesive tape. I have also employed a sizing of linseed oil, preferably oxidized, to strengthen the paper phase of the combination.

When this has been completed, it gives a toughness to the paper, in addition to the reinforcing effects on the paper produced by the strands of the woven fabric, and an exceedingly tough backing is produced, so that when the rubber adhesive is applied to the cloth side or the paper side of the backing, the tape thus formed may be applied to a lacquered surface and yet after considerable period of time may be readily removed without tearing or leaving a deposit of rubber, I have found that the cloth side of the sheet thus formed may be desirably treated with a material such as a thin rubber solution which possesses adhesive qualities and may or may not carry proper vulcanizing and accelerating agents. Preferably a vulcanizing agent is included in the size coat or filler coat and the article vulcanized under the required heat treatment, where such type of vulcanizing agent is used as will require heat treatment. Cold vulcanizing agents, however, may be used in the absence of a heat treatment. This vulcanized rubber treatment insures the tape against damage due to the possibility of a lacquer or lacquer solvent penetrating the tape in the event that it is sprayed on the back or paper side of the tape. Such a penetration unless prevented as pointed out, would result in a softening of the film of rubber adhesive for holding the tape on the article which would cause the rubber to be deposited on the surface which it protects. In the foregoing manner, I am enabled to produce a composite sheet of paper and a woven fabric suitable as a backing for rubber tape which not only protects the surfaces to which it is applied, but possesses inherent resisting qualities so that in removing the tape, the rubber adhesive will come off with the tape and a splitting or delaminating effect will not occur, but on the contrary a substantially entirely homogeneous mass is provided which, when removed, comes off as one piece. This property of the backing may be referred to as producing a "unified" backing and is more particularly defined in my Patent No. 1,760,820.

As an example of one form which this invention may take, I refer to Figures 1 and 2 of the drawing which illustrates partly in perspective and partly in cross-section the combined paper and woven fabric structure. The strands of woven fabric are indicated at 5 and the layer of paper pulp indicated at 6. It will be observed that owing to the application of suction or pressure while the paper pulp is in a plastic state, portions thereof will be drawn into the interstices of fibres of the cloth, as well as between the same, and thus interlock with them or cause them to be imbedded in the paper, as indicated at 7, thereby preventing ready separation of the cloth and paper phases of the article. It will be obvious that the article shown in the drawing can be treated with the further coatings and sizings referred to hereinabove, and these have not been illustrated in the drawing, as it will depend upon the use to which the article is to be placed as to what sizing and coatings are to be applied thereto. Although I have described, as the preferable form of threaded, spun or woven fabric, a thin, wide mesh cheese cloth, it is contemplated by me to include only longitudinally disposed threads, omitting the woof entirely and where I resort to this form, particularly where I give to the fibres or threads a coating of an adhesive substance such as corn dextrine, casein or various grades of hide glue as a sizing, this adhesive material may also be used as a substitute for the woof to hold the longitudinal threads in a fabric and by the process heretofore described, the still plastic paper pulp is pressed in contact therewith to dissolve the adhesive material, to an extent sufficient for welding the fibrous threads to the paper layer in the final forming step. In this way transverse distortion of the paper during the final pressing step will be avoided, thereby avoiding weakening of the fibre in a transverse direction. It is preferred, however, as previously described, to use the cheese cloth type of fabric wherein both the warp and woof are used not only to obtain the advantages of strengthening the composite material longitudinally and transversely from the reinforcement obtained by the threads themselves, but to avoid distortion of the paper pulp and interknitted fibres thereof in a transverse direction during the final pressing or calendering of the still plastic pulp deposited or associated with the woven fabric, as the longitudinal and transverse threads will serve to prevent substantial displacement in both directions.

As a further alternative form of this invention, and more particularly as to the method employed whereby to insure that in carrying out the method, the paper and fabric phases will not be imperfect in the finished article or damaged during the process, I have found that in order to provide for absolute freedom from shrinking of the fabric or breaking apart of the same due to shrinkage during the process, it is necessary, for some purposes, as a prerequisite to the carrying on of the process, that the cloth or fabric be sized or shrunk. With an unbleached and unshrunk cloth in actual operation, I have found that there is a tendency of the cloth to break apart, if not entirely break apart, which is caused by the uneven shrink of the cloth as compared with the paper being formed.

In order to carry out the alternative process successfully, I find it desirable when a paper making machine is employed that the speed be reduced, possibly to one-third of that ordinarily employed in making paper. For this reason, the process here is in the nature of a converting process rather than actually operating in the formation of paper.

According to this alternative process, I employ a finished roll of paper and remoisten the same by passing it through a water bath, then bringing it into contact with the fabric or fibrous material properly coated with a sizing or adhesive and the two passed between rollers for squeezing off the excess water. The resultant product is then passed through can driers until such time as all excess moisture is removed.

An ideal paper backing for tape may be produced by employing an absorbent toweling paper, for example, 35# stock and processing such paper in a manner similar to that which is practiced in producing decorative crepe paper. The glue, glycerine center size or saturating fluid hereinabove referred to, is employed and then the paper and cloth combined and run through the driers. Ordinarily paper stock may be creped in this manner, with the exception that water is used for premoistening the paper in place of the glue, glycerine solution.

I have employed a formaldehyde treatment for forming the tape and particularly for masking tape backing. This sort of tape is employed by painters in the well known manner, and my process here includes the introduction of hexamethylenetetramine into the saturating solution when the operation is being conducted on a creping machine. After this treatment, the paper and cloth are brought together under rolls and the excess moisture removed and thereupon the composite substance is brought into contact with heat such as that derived from a can drier. This heat acts to liberate the formaldehyde content of the saturating solution remaining in the material and thereby results in effecting the proper tanning action of the glue which has been absorbed by the paper.

I find that in the foregoing process and treatment, such an operation is best accomplished on equipment other than that commonly employed for making paper together with suitable means for moistening the desirable paper on one side.

This method further carries no limitations such as the paper weight, that is, where a paper making machine is employed the weight of paper produced thereby has limitations due to the capacity of the machine, whereas in the method outlined above, I may employ any paper stock and by the employment of the process set out above combine this paper stock with the fibrous material.

It is to be understood that my invention is not to be confused with those well known combinations of paper and cloth wherein a finished sheet of paper is affixed to cloth or other similar woven fabric for binding purposes such, for example, as employed in the binding of books and the like. In such instances, the paper and cloth are merely adhesively connected and there is no homogeneous association of these elements as in the present invention.

Having thus described my invention and illustrated its use, what I claim as new and desire to secure by Letters Patent is:

1. The method which includes forming a paper pulp into a plastic state employing a woven fabric backing and interlocking the paper fibre with the structure of said woven fabric by applying an adhesive sizing including corn dextrine to the woven fabric, applying the paper fibre in plastic state thereto, and forcing the fibre into the interstices of the woven fabric.

2. The method which includes forming a paper pulp into a plastic state employing a woven fabric backing and interlocking the paper fibre with the structure of said woven fabric by applying an adhesive sizing of glue, glycerine and formaldehyde to the woven fabric, applying the paper fibre in plastic state thereto, and forcing the fibre into the interstices of the woven fabric.

3. In an adhesive tape, a backing including a paper material and a woven fabric brought into homogeneous relationship to cause the particles of paper to enter the interstices of the woven fabric, a sizing coat for the backing, and a rubber adhesive coating applied to the cloth side of said backing.

4. The method of making an adhesive tape which includes embedding spaced, spun threaded fibrous material in paper pulp, finishing the paper pulp into paper in contact with said fibrous material, applying a pressure sensitive adhesive coating of a rubber base on the fibrous side of the composite sheet thus formed, to adhesively combine the same with the combined fibrous and paper surface and a size coat of glue, glycerine and formaldehyde on the opposite side of the composite sheet.

5. The method of making an adhesive tape which includes embedding spaced, spun, threaded fibrous material in paper pulp, finishing the paper pulp into paper in contact with said fibrous material, applying a rubber base adhesive coating on the fibrous side of the composite sheet thus formed to adhesively combine the same with the combined fibrous and paper surface.

6. The method of making a composite sheet material which includes employing a sheet of cellulose in the form of paper, moistening said paper, applying a spaced fibrous threaded material to the moistened paper, applying the pressure to the two for drawing off the excess moisture, and applying heat thereto.

7. The method of making a composite sheet material which includes employing a sheet of cellulose in the form of paper, moistening said paper, applying sized spaced fibrous threaded material to the moistened paper, applying the pressure to the two for drawing off the excess moisture, and applying heat thereto.

8. The method of making a composite sheet material which includes as steps thereof, sizing a spaced fibrous threaded material with a formaldehyde solution, moistening a cellulose sheet, subjecting the threaded material and said sheet to pressure for bringing them together as a substantially homogeneous piece, and applying heat to the composite sheet thus formed.

9. The method of making a composite sheet material which includes as steps thereof, sizing a spaced fibrous threaded material with a formaldehyde liberating solution, moistening a cellulose sheet, applying an adhesive to said sheet, subjecting the threaded material and said sheet to pressure for bringing them together as a substantially homogenous piece, and applying heat thereto for liberating the formaldehyde content and thereby tanning the adhesive.

10. The method which includes employing a woven fabric backing and interlocking a paper fiber with the structure of said woven fabric by applying a gelatinous adhesive sizing to the woven fabric, applying the paper fiber in a plastic paper state with substantially the beater moisture content thereto and forcing the fiber into the interstices of the woven fabric throughout the paper forming process.

11. In an adhesive tape, a backing including a plastic material and a woven fabric brought into homogeneous relationship therewith, to cause the plastic material to enter the interstices of the woven fabric, a sizing coat for the backing and a rubber adhesive coating applied to the cloth side of said backing.

RICHARD GURLEY DREW.